United States Patent
Shand et al.

[11] Patent Number: 6,111,257
[45] Date of Patent: Aug. 29, 2000

[54] SUPPORT ASSEMBLY FOR SCINTILLATING CRYSTAL

[75] Inventors: Dennis C. Shand, Cuyahoga Falls; Frank C. Valentino, Solon; John R. Leichliter, Maple Heights, all of Ohio

[73] Assignee: Picker International, Inc., Cleveland, Ohio

[21] Appl. No.: 08/975,577

[22] Filed: Nov. 21, 1997

[51] Int. Cl.[7] .............................. G01T 1/20; G01T 1/164
[52] U.S. Cl. ................................................. 250/368
[58] Field of Search ............................ 250/368, 363.1, 250/363.06, 363.05, 363.08, 485.1

[56] References Cited

FOREIGN PATENT DOCUMENTS 0129682  1/1985  European Pat. Off. ............... 250/368

Primary Examiner—Seungsook Ham
Assistant Examiner—Richard Hanig
Attorney, Agent, or Firm—Timothy B. Gurin; John J. Fry

[57] ABSTRACT

A gamma camera includes at least one detector assembly 10. The detector assembly includes an array of photomultiplier tubes, a sheet of scintillating crystal material, a sheet of optical glass, and a matrix of mu-metal material. The mu-metal matrix defines an array of apertures corresponding to the array of photomultiplier tubes into which apertures the photomultiplier tubes are inserted. The scintillating crystal is bonded to the first surface of the optical glass. The mu-metal matrix is connected to the second surface of the sheet of optical glass using an adhesive such as an epoxy cement. By integrating the metal matrix into the structure formed by the glass sheet and the crystal, the glass sheet may be made thinner than before while the crystal is supported against possible bending and consequent fracture.

24 Claims, 3 Drawing Sheets

SUPPORT ASSEMBLY FOR SCINTILLATING CRYSTAL

BACKGROUND

The present invention relates to the art of nuclear imaging. It finds particular application in relation to gamma cameras having a detector which utilizes a scintillating crystal.

In nuclear imaging, a radiopharmaceutical containing a radionuclide such as $^{99m}$Tc or $^{201}$Tl is introduced into the body of a patient. As the radiopharmaceutical decays, gamma rays are generated. These gamma rays are detected and used to construct a clinically useful image.

The gamma rays are detected using one or more detectors. These detectors ordinarily include a scintillator crystal which emits photons or light energy in response to incident radiation such as a gamma ray or other high energy photon. An array of photomultiplier tubes (PMTs) is used to detect the light emitted by the scintillator crystal. The signals generated by the PMTs are in turn used to determine the location and energy of the detected event. This information is used to produce an image indicative of the patient's anatomy.

A sheet of optical glass has been placed adjacent the scintillator crystal on the side facing the source of radiation (i.e. on the side nearer the imaging region of the gamma camera). The sheet of optical glass has been bonded to the scintillator using a silicon optical adhesive in a procedure performed by the Bicron Technology business unit of St. Gobain/Norton Industrial Ceramics Corporation, located in Newbury, Ohio. The bond allows the crystal and the optical glass to be mechanically joined without adversely affecting the path of photons through the interface between the glass and crystal. Hence, one function of the optical glass is to provide structural support to the scintillator crystal.

Conventionally, the scintillating crystals used in gamma cameras have had a thickness of 0.375 inches (0.9525 cm), and the optical glass has had a thickness of 0.675 inches (1.7145 cm). The bonding material has a nominal thickness of approximately 0.030 inches (0.0762 cm) such that the total thickness of the crystal-glass structure is approximately 1.030 inches (2.62 cm).

A honeycomb of a nickel alloy commonly known as mu-metal has, together with the PMTs, been pressed against the rear surface of the optical glass. The mu-metal structure defines a plurality of hexagonal apertures into which the PMTs have been placed. The mu-metal structure surrounding each of the PMTs reduces the effects of the earth's magnetic field as the detector is moved about the patient.

A number of factors make it desirable to vary the relative thicknesses of the optical glass and the scintillator crystal. One example arises in positron emission tomography (PET), a branch of nuclear medicine in which a positron emitting radiopharmaceutical such as $^{18}$F-fluorodeoxyglucose (FDG) is introduced into the body of a patient. Each emitted positron reacts with an electron in what is known as an annihilation event, thereby generating a pair of gamma rays which are emitted in directions approximately 180 degrees apart, i.e. in opposite directions. The gamma rays produced by a positron annihilation are characterized by a photopeak at 511 keV, as compared to a 140 keV photopeak for $^{99m}$Tc.

A pair of detectors registers the positions and energy of the respective gamma rays, thereby providing information as to the position of the annihilation event and hence the positron source. Because the gamma rays travel in opposite directions, the positron annihilation is said to have occurred along a line of coincident connecting the detected gamma rays. A number of such events are collected and used to reconstruct a clinically useful image.

Sensitivity and resolution are important gamma camera characteristics. A higher sensitivity permits the use of smaller doses of radiopharmaceutical. For a given amount of incident radiation, the gamma camera detects a larger number of events and thereby produces images having greater diagnostic utility.

One factor which affects the sensitivity and resolution of a gamma camera is the efficiency of its scintillating crystal. In fact, many of the incident gamma rays pass through the crystal without any interaction and are thus not detected by the gamma camera. The efficiency of the crystal is also function of the energy of the gamma radiation. For example, conventional NaI(Tl) crystals have a lower efficiency at energies associated with PET imaging than at energies associated with more conventional nuclear imaging.

In order to improve gamma camera performance, it is becoming increasingly important to increase the efficiency of the scintillating crystal. For example, nuclear cameras are increasingly being used to perform positron annihilation imaging, with its relatively higher energies. It is also desirable to increase the efficiency of the scintillating crystal at lower energies.

One technique for improving the efficiency of the scintillator crystal is to increase its thickness. Gamma rays passing through the crystal are thus more likely to interact with the crystal and thus produce a flash of light detectable by the PMTs. There are, however, a variety of practical considerations which make it difficult to simply increase the thickness of the crystal.

Among these considerations is the fact that optical design constraints limit the overall thickness of the detector. Moreover, retrofitting thicker crystals on existing cameras and camera designs is facilitated if the improved crystal structure fits in the pre-existing support structure. Further, adequate structural support for the relatively fragile crystal must still be provided. Thus, a technique which facilitates the use of a thicker scintillating crystal while providing adequate structural support in a size efficient package is needed.

SUMMARY

The present invention addresses these matters, and others.

According to a first aspect of the present invention, an apparatus for use with a gamma camera detector assembly has an array of photodetectors in optical communication with a layer of scintillating material. The apparatus also includes a sheet of light transmissive material having first and second opposed surfaces. The first surface of the light transmissive material is adapted to support the scintillating material. The apparatus also includes a member which defines an array of apertures adapted to allow light emitted by the scintillating material to be received by the array of photodetectors. The member is rigidly attached to the second surface of the sheet of light transmissive material, and its array of apertures corresponds to the array of photomultiplier tubes.

According to a more limited aspect of the present invention, the member is attached to the sheet of light transmissive material using an adhesive.

According to a still more limited aspect of the present invention, the member is in physical contact with the second surface of the sheet of light transmissive material and the adhesive forms a bead along an interface thereof.

According to a still more limited aspect of the present invention, the sheet of light transmissive material is made of glass, and the member includes a web of material extending in a direction normal to the second surface of the sheet of light transmissive material. According to still more limited aspects of the invention, the member is fabricated from mu-metal, and the photodetectors are photomultiplier tubes, and the photomultiplier tubes are inserted in the apertures.

According to another aspect of the present invention, a gamma camera detector assembly includes a scintillator crystal having a first generally planar surface, an array of photomultiplier tubes in optical communication with the scintillator crystal, and a sheet of light transmissive material disposed between the scintillator crystal and the array of photomultiplier tubes. The sheet has first and second opposed, generally planar surfaces, and the first surface of the sheet supports the first surface of the crystal. The assembly also includes a mu-metal matrix which defines an array of apertures corresponding to the array of photomultiplier tubes, and each of the tubes is inserted in one of the apertures. The improvement is characterized in that the mu-metal matrix resists flexure of the sheet of light transmissive material.

According to a more limited aspect, the mu-metal matrix is rigidly affixed to the second surface of the light transmissive material using an epoxy.

According to yet another aspect of the present invention, a gamma camera includes first and second detectors mounted about an examination region for detecting gamma radiation emanating therefrom. The first and second detectors each comprise a scintillator crystal having opposed first and second surfaces, with the first surface facing the examination region. The detector also includes a member defining a plurality of apertures having axes normal to the second surface of the sheet of light transmissive material, a plurality of photodetectors in optical communication with the crystal, the apertures allowing light emitted by the scintillator crystal to be received by the photodetectors, and means for rigidly affixing the member to the second surface of the sheet of light transmissive material.

According to a more limited aspect of the present invention, the gamma camera includes means for determining whether events detected by the respective detectors are characteristic of a positron annihilation event. According to another more limited aspect, the crystal has a thickness greater than or equal to 0.750 inches, and the sheet of light transmissive material has a thickness less than 0.375 inches.

A first advantage of the present invention is that the efficiency of a gamma camera may be increased without increasing the thickness of the detector.

Another advantage of the present invention is that a relatively thicker scintillator crystal may be provided with adequate structural support.

Still another advantage of the present invention is that a scintillator crystal adapted for positron coincidence imaging may be readily installed in a conventional gamma camera.

Still another advantage of the present invention is that additional structural support is provided without adding an existing member to the gamma camera.

Still other advantages of the present invention will be appreciated by those skilled in the art upon reading and understanding the appended description.

DRAWINGS

DESCRIPTION

Figure 1:
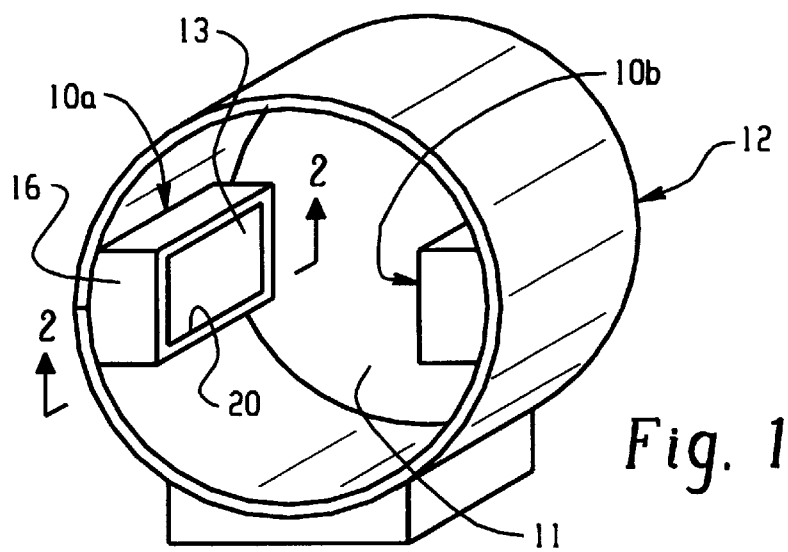
FIG. 1 is a perspective illustration of a medical imaging camera having a radiation detector constructed in accordance with the present invention.

With reference to FIG. 1, a gamma camera 12 includes a pair of radiation sensitive detectors 10a, 10b disposed in an opposed relationship about an examination region 11 in to which a patient (not shown) may be placed. The detectors 10 a, 10b include radiation sensitive faces 13 which detect gamma radiation emanating from within the examination region, for example caused by the decay of radionuclides such as $^{99m}$Tc, $^{201}$Tl, FDG, or the like introduced into the anatomy of the patient. While two detectors are shown, it will be appreciated that a greater or lesser number of detectors may be used. Similarly, the detectors may be in other than an opposed relationship, for example at approximately right angles or spaced about the examination region 11 at equal angular intervals. As is known in the art, the detectors 10a, 10b are preferably rotatable about the examination region 11.

Each detector 10 includes a crystal assembly 14 which is mounted in an enclosure 16 such as a generally rectangular lead box. The enclosure 16 is conventional and is preferably the same size and configuration as that used by Picker International, Inc., the assignee of this invention, in its currently marketed Prism 2000 cameras.

Figure 2:
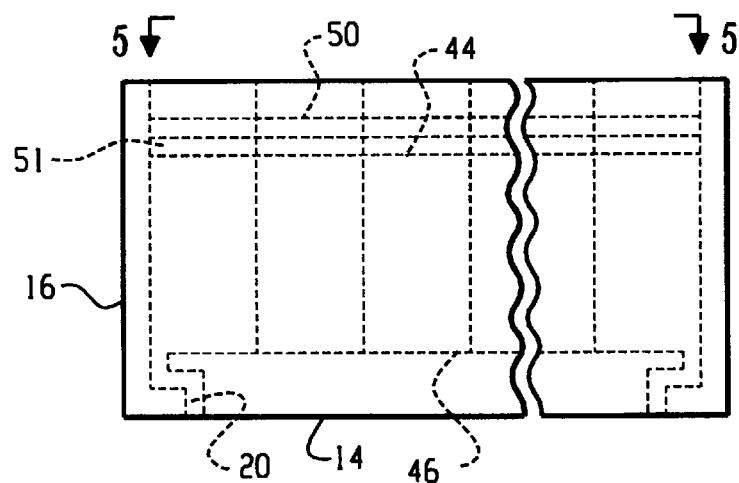
FIG. 2 is a view looking generally in the direction of arrows 2—2 of FIG. 1.
Figure 3:
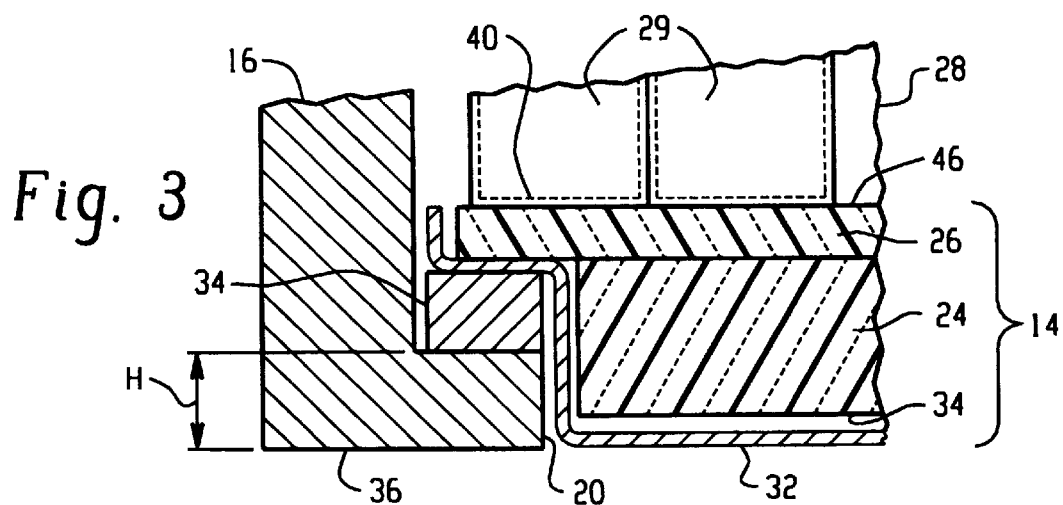
FIG. 3 is an enlarged cross sectional view of a portion of FIG. 2.

With reference to FIGS. 2 and 3, the enclosure 16 includes a peripheral lip 20 which projects inward around the bottom of the enclosure 16 (as viewed in FIGS. 2 and 3) and defines an opening in which the crystal assembly 14 is received. The lip 20 has a vertical dimension of 0.375 inches (0.9525 cm) as indicated by the dimension H in FIG. 3.

The crystal assembly 14 is mounted in the enclosure 16. The crystal assembly includes a scintillating crystal 24, and a sheet of optical glass 26. The crystal 24 is bonded to the glass 26 by Bicron Technology of Newbury, Ohio using a process which utilizes a silicon optical adhesive. A covering 32 of aluminum 0.050 inches (0.127 cm) thick protects the otherwise exposed face 34 of the crystal. The covering 32 is hermetically sealed along the perimeter of the optical glass sheet 26 using an epoxy.

In a preferred embodiment, the crystal 24 has a thickness of approximately 0.750 inches (1.905 cm), while the optical glass 26 has a thickness of approximately 0.375 inches (0.9525 cm). The optical adhesive layer introduces a nominal thickness of 0.030 inches (0.0762 cm). Thus, crystal and optical glass have a combined thickness of approximately 1.155 inches (2.9337 cm). The glass sheet has dimensions of 24.375×19.5 inches (61.9×49.5 cm). The crystal 24 is approximately one inch smaller in both dimensions, resulting in an overhang of glass 26 about 0.5 inches (1.27 cm) wide around the perimeter of the crystal 24.

A preferred scintillator crystal 24 is NaI(Tl) (sodium iodide doped with thallium). However, the crystal 24 may be any other known scintillating material such as CsI(Na) (cesium iodide doped with sodium) or CSI(Th) (cesium iodide doped with thallium).

The crystal assembly 14 rests on an aluminum shim 34, which in turn rests on the lip 20 of the enclosure 16. The shim 34 is dimensioned so that when the crystal assembly 14 is installed, the aluminum covering 32 is flush with the bottom 36 of the enclosure 16. Accordingly, the shim 34 has a thickness of approximately 0.375 inches (0.9575 cm).

Figure 4:
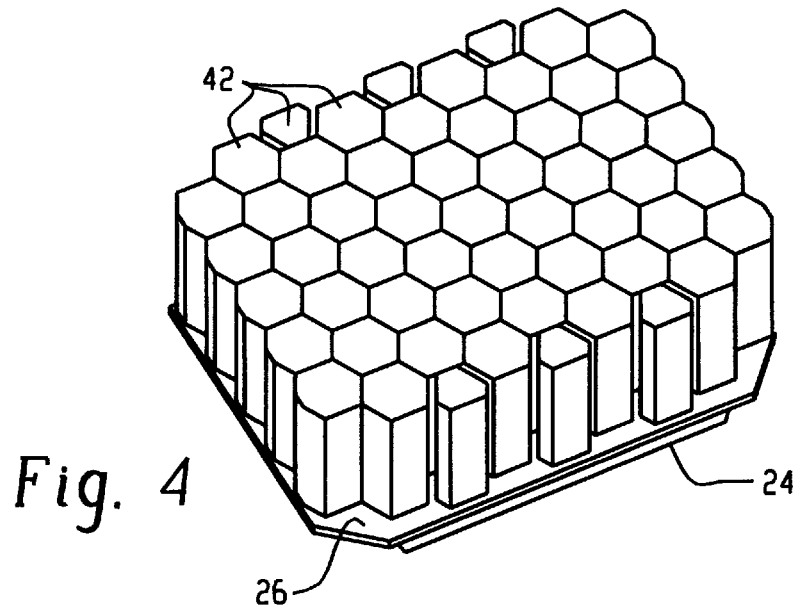
FIG. 4 is a perspective view of a Mu-metal honeycomb, optical glass, and crystal assembly constructed in accordance with the present invention.

With continuing to FIGS. 2 and 3 and further reference to FIG. 4, a mu-metal honeycomb or matrix 28 defines an array of hexagonal apertures configured to accept a corresponding array of light sensitive devices such as conventional PMTs 29 in a conventional close-packed arrangement. The apertures have axes which extend in a direction normal to the glass sheet 26. The matrix 28 has generally planar top 44 and bottom 46 surfaces which are orthogonal to the longitudinal axes of the tubes 42. The matrix 28 has a height of approximately 5.63 to 5.69 inches (14.30 to 14.45 cm).

The matrix 28 is formed from a plurality of hexagonal tubes 42. Each of the hexagonal tubes 42 is formed from a sheet of Mu-metal having a thickness of 0.014 inch (0.356 mm). The tubes 42 are spot-welded together to form the matrix 28.

While the majority of apertures are sized to accept PMTs 29 having a nominal diameter of 3 inches (7.62 cm), several PMTs near the edge of the detector have a nominal diameter of 2 inches (5.08 cm). Of course, the tubes 42 can be configured to receive PMTs having other form factors or having a different arrangement. Similarly, PMTs having hexagonal or square faces can readily be accommodated.

A PMT is inserted into each aperture from the direction of the top surface 44 such that the PMTs are constrained against the top surface 46 of the glass sheet 26 with their light sensitive faces facing the glass sheet 26. Thus, light emitted by the scintillator crystal 24 is detectable by the PMTs 29. A layer 51 of foam contains an array of die cut apertures which corresponds to the array of apertures in the matrix 28 and the array of PMTs 29. The apertures are slightly smaller than the diameter of the PMTs. The layer of foam 51 is held in place by a compression plate 50 such the PMTs 29 and the matrix 28 are pressed against the top surface 46 of the glass sheet 26.

With reference to FIGS. 3, 4, 5 and 6, the bottom surface 46 of the matrix 28 is rigidly attached to the top surface 40 of the glass sheet 26 using an epoxy adhesive. The preferred adhesive is marketed under the trade name EpoTek 310 by Epoxy Technology, Inc. of 14 Fortune Drive, Billerica, Mass. 01821. The epoxy is mixed at a ratio of 10 parts resin to 5.5 parts hardener. After curing, the epoxy has a transmission of greater than 96% for light with wavelengths between 3400 and 9000 Å and an index of refraction of 1.5071 and a lap shear strength of 570 PSI.

The surfaces which are to be glued or bonded are first cleaned with a suitable cleaner such as glass cleaner or alcohol, and the matrix 28 is placed in position on top of the glass sheet 26. After mixing, the epoxy is cured for two (2) hours at a temperature of 65 degrees Fahrenheit (room temperature). A syringe having a needle with an inner diameter of 0.070 inches (0.1778 cm) is then used to apply a bead 48 of epoxy having a width of approximately 0.125 inches (0.3175 cm) to the interface between the matrix 28 and the glass sheet 26.

Figure 5:
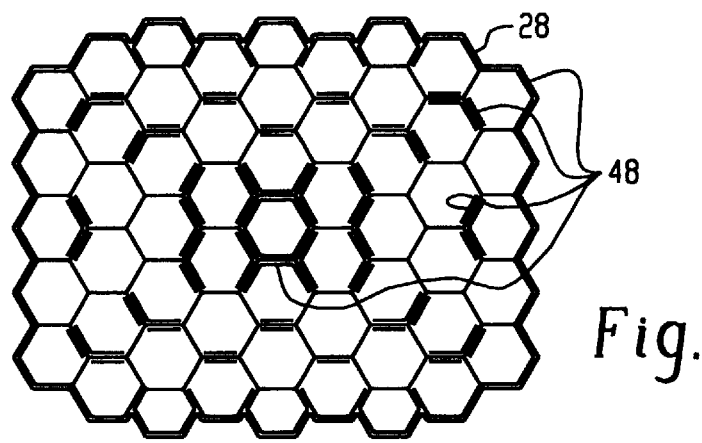
FIG. 5 is a top view of the mu-metal matrix depicting the areas in which epoxy is applied to the interface between the matrix and the optical glass.
Figure 6:
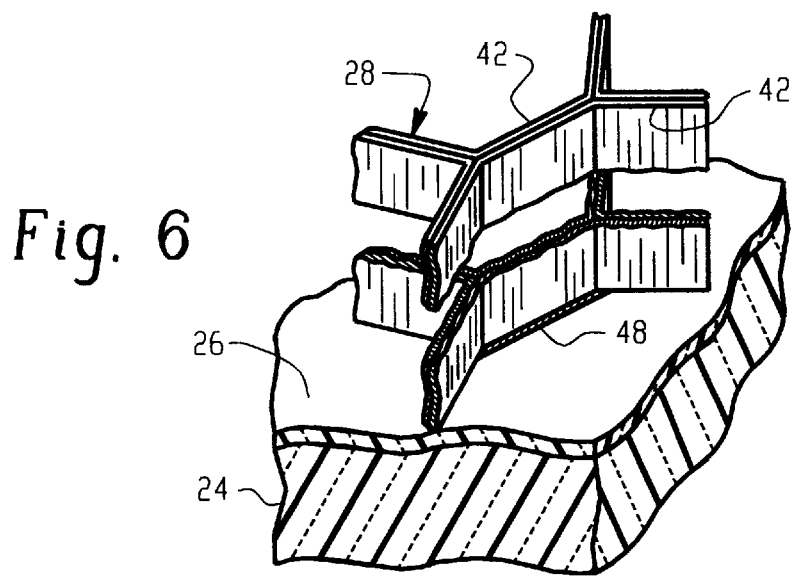
FIG. 6 is a perspective view of a portion of the assembly of FIG. 4 showing a bead of adhesive bonding a portion of the Mu-metal honeycomb to the optical glass.

With reference to FIG. 5, the bead 48 of epoxy is applied along the interface in the areas marked with heavy lines. Although the lines are shown to be spaced apart from the matrix 28 for ease of illustration, it will be appreciated that the epoxy is applied at the interface between the matrix 28 an the glass sheet, taking care to apply the glue to the two surfaces evenly. The epoxy is allowed to cure at room temperature for at least twenty four hours before handling. The crystal assembly may then be installed in the detector assembly 10.

The honeycomb 28 shown is formed of sheets or webs of mu-metal bent into hexagonal tubes and connected to each other. Other configurations are also possible. For example, the metal could be arranged to form square or diamond shaped tubes, or the honeycomb could be formed of cylinders connected at their tangent points. Alternately, the honeycomb may be formed from a single member with material removed to form aperture or or apertures, or it could be cast, molded, or the like in a desired configuration. Of course, in practicing the invention, the designer must consider the size and shape of the radiation detecting device, such as a PMT, that will be installed in the honeycomb. The primary consideration is that the matrix 28 should, when bonded to the optical glass, resist flexure of the glass sheet 26.

The matrix 28 has been described as being rigidly affixed to the optical glass using an epoxy. The matrix 28 may be bonded to the glass using other suitable adhesives, for example a pressure sensitive adhesive die cut to conform to the web of material which forms the matrix. The adhesive thus adheres the matrix 28 to the glass 26 without interfering with light transmission to the PMTs. Similarly, other mechanical fasteners may also be used, provided that they provide a suitable interconnection without unduly interfering with transmission of light from the crystal 24 to the PMTs.

Figure 7:
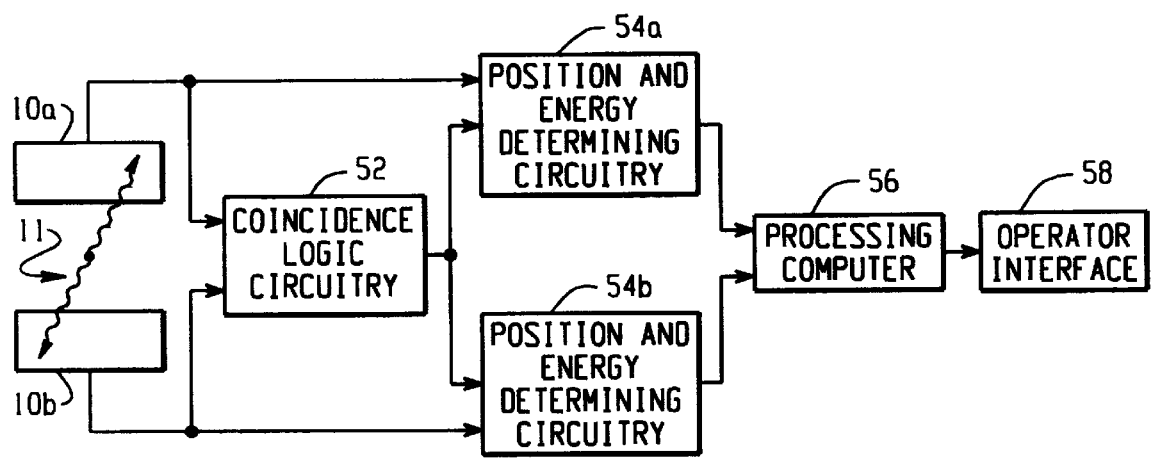
FIG. 7 is a functional block diagram of a gamma camera.

With reference to FIG. 7, the outputs of the PMTs 29 are fed to coincidence logic circuitry 52 and position and energy determining circuitry 54a, 54b. The coincidence logic 52 determines if events are detected substantially simultaneously by detectors 10a, 10b and are thus characteristic of a positron annihilation event. If so, the position and energy determining circuitry 54a, 54b determines the positions and energies of the detected events. The information is fed to a processing computer 56 which uses the uses conventional techniques to reconstruct a clinically useful image of the patient. The image is displayed on an operator interface 58 which includes a computer monitor, printer, or the like. In conventional nuclear imaging, the coincidence logic circuitry 52 may be omitted or disabled.

In operation, the detectors 10a, 10b are installed on the gamma camera 12 with their radiation sensitive faces 13 facing the examination region 11. Gamma rays emitted from a patient inserted in the examination region interact with the scintillating crystals 24, with these interactions producing a flash of light. Light traveling in the direction of the PMTs passes through the optical glass 26 and is received by one or more of the PMTs 29.

In positron coincidence imaging, the coincidence detection circuitry 52 determines if the detected events are valid coincidence events. If so, the locations and energies of the events are appropriately logged and used to produce an image indicative of the internal anatomy of the patient. In conventional nuclear imaging, the locations and energies of the detected events are logged and used to produce an image indicative of the patient's internal anatomy.

The detectors 10a, 10b and the scintillating crystals 24 are subject to varying mechanical stresses, for example caused by the compression plate 50 and foam 51, during shipment and handling of the gamma camera 12 or as the detectors 10a, 10b are rotated about the examination region. The mu-metal matrix 28 imparts structural rigidity to the optical glass 26 and hence provides additional support to the scintillating crystals 24. In particular, the matrix 28 inhibits flexure of the glass sheet 26 in the directions normal to the plane defined by the sheet 28.

It should be noted that the present invention is not limited to use in gamma cameras for use in positron coincidence imaging. It finds particular application in systems having detectors where additional structural rigidity is desired. Thus, for example, the invention is applicable where the optical material has undesirable physical properties, the optical material is relatively thin, where the scintillator material is relatively fragile, or in wide field of view or other large detectors.

It should also be noted that the matrix 28 may be fabricated from materials other than mu-metal. It may be manufactured, for example, from other metals, polymers, or other materials possessing a desired structural rigidity. It is also not necessary that the height of the matrix 28 be sufficient to extend the length of the PMTs 29, provided that the configuration of the matrix 28 imparts the desired rigidity. It is particularly advantageous, however, if the height of the matrix 28 is sufficient to locate the PMT's in their respective positions in the x,y matrix.

The invention has been described with reference to the preferred embodiment. Obviously, modifications and alterations will occur to others upon reading an understanding the preceding description. It is intended that the invention be construed as including all such modifications and alterations insofar as they come within the scope of the appended claims or the equivalents thereof.

What is claimed is:

1. An apparatus for use with a gamma camera detector assembly having an array of photodetectors in optical communication with a layer of scintillating material which emits light in response to incident radiation, the apparatus comprising:
   a sheet of light transmissive material having first and second opposed surfaces, the first surface being adapted to support the layer of scintillating material; and
   a unitary member which defines a corresponding array of apertures adapted to allow light emitted by the scintillating material to be received by the array of photodetectors, the member being rigidly attached to the second surface of the sheet of light transmissive material.

2. The apparatus of claim 1 wherein the member is attached to the sheet of light transmissive material using an adhesive.

3. The apparatus of claim 2 wherein the member is in physical contact with the second surface of the sheet of light transmissive material and the adhesive forms a bead along an interface between the member and the second surface of the sheet of light transmissive material.

4. The apparatus of claim 2 wherein
   the sheet of light transmissive material comprises glass; and
   the member comprises a web of material extending in a direction normal to the second surface of the sheet of light transmissive material.

5. The apparatus of claim 4 wherein the member comprises mu-metal.

6. The apparatus of claim 5 wherein the photodetectors are photomultiplier tubes.

7. The apparatus of claim 6 wherein the photomultiplier tubes are disposed in the apertures.

8. The apparatus of claim 1 wherein the apertures are hexagonal in cross section.

9. The apparatus of claim 1 wherein the sheet of light transmissive material comprises glass and the glass has insufficient structural rigidity to support the layer of scintillating material without damage.

10. In a gamma camera detector assembly of the type having
    a scintillator crystal having a first generally planar surface;
    an array of photomultiplier tubes in optical communication with the scintillator crystal;
    a sheet of light transmissive material disposed between the scintillator crystal and the array of photomultiplier tubes, the sheet having first and second opposed, generally planar surfaces, the first surface of the sheet supporting the first surface of the crystal; and
    a mu-metal matrix which defines an array of apertures corresponding to the array of photomultiplier tubes, each of the photomultiplier tubes being inserted in one of the apertures;
    the improvement characterized in that the mu-metal matrix resists flexure of the sheet of light transmissive material along an axis normal to the sheet of light transmissive material.

11. The apparatus of claim 10 wherein the mu-metal matrix is rigidly affixed to the second surface of the sheet of light transmissive material using an epoxy.

12. The apparatus of claim 10 where the apertures extend in a direction normal to the second surface of the sheet.

13. A gamma camera comprising first and second detectors mounted about an examination region for detecting gamma radiation emanating therefrom, the first and second detectors each comprising:
    a scintillator crystal which emits light in response to incident radiation, the crystal having opposed first and second surfaces, the first surface facing the examination region;
    a sheet of light transmissive material having opposed first and second surfaces, the first surface of the sheet of light transmissive material facing the second surface of the crystal;
    a unitary member defining a plurality of apertures having axes normal to the second surface of the sheet of light transmissive material;
    a plurality of photodetectors in optical communication with the crystal, the apertures allowing light emitted by the scintillator crystal to be received by the photodetectors;
    means for rigidly affixing the member to the second surface of the sheet of light transmissive material, whereby the member resists flexure of the sheet.

14. The gamma camera of claim 13 further comprising means for determining if gamma radiation detected by the detectors is characteristic of a positron annihilation event.

15. The gamma camera of claim 13 wherein the member comprises a plurality of mu-metal tubes.

16. The gamma camera of claim 13 wherein the photodetectors are photomultiplier tubes and each of the photomultiplier tubes is received in an aperture.

17. The gamma camera of claim 13 wherein the means for rigidly affixing comprises an adhesive.

18. The gamma camera of claim 13 wherein the scintillator crystal has a thickness greater than the thickness of the sheet of light transmissive material.

19. The gamma camera of claim 18 wherein the scintillator crystal has a thickness of 0.750 inches and the sheet of light transmissive material has a thickness of 0.375 inches.

20. The gamma camera of claim 13 wherein the second surface of the scintillator crystal is bonded to the first surface of the light transmissive material.

21. A method of assembling a sheet of optical glass having first and second opposed surfaces, the first surface being adapted to support a layer of scintillating material, and an unitary mu-metal member, the method comprising the steps of placing unitary mu-metal member which defines an array of apertures adapted to receive a corresponding array of photomultiplier tubes in contact with the second surface of the optical glass; and attaching the unitary mu-metal member to the optical glass.

22. The method of claim 21 wherein the step of attaching comprises applying an adhesive to an interface between the mu-metal member and the second surface of the optical glass.

23. The method of claim 22 wherein the adhesive comprises a bead of epoxy.

24. The method of claim 21 including, after the steps of placing and attaching, the step of inserting a plurality of photomultiplier tubes into a corresponding plurality of apertures.

* * * * *